United States Patent Office 2,953,462
Patented Sept. 20, 1960

2,953,462

COATING COMPOSITION, METHOD OF APPLYING SAME TO A FOOD, AND COATED FOOD PRODUCT

Havard L. Keil, Clarendon Hills, and Robert F. Hagen and Robert W. Flaws, Evergreen Park, Ill., assignors to Armour and Company, Chicago, Ill., a corporation of Illinois No Drawing. Filed Mar. 25, 1957, Ser. No. 647,954

36 Claims. (Cl. 99—169)

This invention relates to a coating composition for a product to be packaged and a method of preparing the same, and more particularly to such a composition incorporating gelatin and a meta phosphate polymer which results in a new coating having desirable properties for the protection and packaging of products.

Many articles of manufacture are attacked by mold. This results in a product that is not only unsightly but is offensive in odor. The remedies employed in the past to correct this situation have suffered from a number of drawbacks. Some were effective only for a limited time, and in view of the rapid propagation of mold, the problem was only temporarily alleviated. Others carried with them disagreeable odors or appearances that although corrected the primary problem, substituted something also of a disagreeable nature. Yet other forms of remedying this problem of mold, such as coatings of various chemical agents, substantially lessened the color retentivity of the product to which they were applied, or the coatings themselves lacked a high degree of transparency whereby the attractiveness and, in many cases, the saleability of the product coated was substantially lessened.

Many items of food are especially susceptible to mold growth, since a ready source of nutriment for the mold is provided. Many such items appeal primarily to the senses of sight and smell of the purchaser, so that any agent used to prevent the growth of mold must also process a high degree of transparency when applied to the food item and permit the color of the food to be retained so as to provide sales appeal to the purchaser. In addition, a mold prevention agent must not substitute a disagreeable odor for the odor ordinarily associated with the item of food when fresh.

It is therefore an object of our invention to provide a new and useful coating composition. Another object is to provide a coating composition that is tough, transparent, readily strippable from the product it encases, easily applied, capable of retaining color, and which is water resistant. Yet another object is to provide a composition having all of the foregoing characteristics and in addition to be able to substantially inhibit the growth of mold thereon. Still another object is to provide an article of manufacture including an outer coating of the characteristics set forth above. Another object is to provide a new and useful method for applying such a coating to a product to be packaged. Other objects and advantages of our invention will be seen as this specification proceeds.

In one embodiment of our invention a useful coating is produced through the use of gelatin together with a phosphate polymer. This coating may have as an important ingredient the complex formed by gelatin and a polymer of a meta phosphoric acid. Conveniently this complex can be formed by dispersing the ingredients in an acidic aqueous solution which then can be used directly for coating the particular item desired. For example, the item to be coated can be dipped into the complex-containing solution to enrobe the item with a transparent, water-resistant coating which permits dehydration of the enrobed item if desired.

We have employed dipping of products since that appeared most feasible for many food-coating operations. However, it is to be noted that other application operations such as spraying, cascading, painting, or the like, also lend themselves to commercial practice.

To prepare the solution into which the item to be coated may be dipped or otherwise provided with a coating, we mix gelatin and a meta phosphate polymer in an acidic aqueous solution. The acidity can be obtained through the use of a wide variety of acids. When the item to be coated is a food, we prefer to employ a nontoxic acid such as a physiologic acid. Among these are acetic, gluconic, lactic, hydrochloric, and the like.

The gelatin employed in our invention may be any gelatin in the range of 80–275 Bloom. Since this characteristic is well understood by those skilled in the art and is uniformly used to identify gelatin, we feel it unnecessary to describe this means of characterization in detail except to state that the higher the Bloom rating, the faster a prescribed solution of the gelatin will "gel." In other words, the higher the rating, the higher the temperature at which the gelatin forms a solid. Thus, a gelatin having a Bloom the higher ranges forms a superior solid in that it possesses those characteristics of resiliency, clarity, strength, and the like, generally associated with solid gelatin. We prefer to employ a gelatin having a Bloom rating in the higher portion of the range.

For the meta phosphate polymer which when added to an acidic aqueous solution becomes a meta phosphoric acid polymer, we can employ a wide variety of salts of meta phosphate polymers. The acids themselves are usually unstable in storage, becoming the corresponding orthophosphoric acids upon standing. For this purpose, the salt employed is preferably one which is non-toxic and readily available, such as those formed by alkali metals as cations. For example, the sodium salt is known to be physiologically acceptable, so we have found that to be the convenient form of providing the meta phosphate polymer since it will provide a compound not generally susceptible of degeneration upon standing. While any salt may be employed such as sodium, calcium, potassium, magnesium, strontium, barium, aluminum, etc., if the coating is to be employed on an edible product, the sodium, calcium, potassium or aluminum salts of a meta phosphate acid polymer, or any other suitable edible salt, should be employed.

There is an entire series of metal phosphate polymers which are useful in the practice of our invention and which can be represented by the following structural formula:

In the foregoing formula, X and Y may be a cation such as an alkali metal atom or a hydrogen atom, and $n$ is an integer of two or more.

As indicated above, in the preferred form of the practice of our invention, the meta phosphate polymer is added to the acidic aqueous solution in the form of a stable salt.

In the preparation of our coating solution, the solution should be heated slightly so as to elevate the temperature above the melting-point of gelatin, which is about 42° C. Raising the temperature decreases the viscosity of the coating solution so that upon applying the coating, a thinner coat is achieved. Ordinarily we prefer a solution temperature in the range of about 42°–60° C.

We generally add a quantity of acid to the aqueous solution so as to depress the pH thereof to below about 3.5. Any lower pH is acceptable although we prefer not to go below about 1.5 so as to minimize the possibility of corrosion of the solution vessel. In this range we have obtained optimum results with a pH of about 2.0.

Generally, a quantity of gelatin and a meta phosphate polymer is included in the coating solution so as to make the total solids content in the range of about 10–40%. Concentrations outside these limits can be employed depending upon the needs of a particular coating operation.

We have found that gelatin and a meta phosphate polymer, when present in acidic aqueous solution in a ratio of about 4 to 1, react to form a stable complex. However, a superior coating is also produced when there is an excess of either ingredient. We prefer, however, to employ a concentration of meta phosphate polymer which is about 5–50% of the amount of total solids. Alternatively expressed, the ratio of gelatin to meta phosphate polymer may vary in the range of 19 to 1 to about 1 to 1. Excess of one or the other ingredient varies the characteristics of the coating somewhat, but in any case an important feature of the coating is the above-described complex. We have determined the composition of the complex to be about 20–21% meta phosphate polymer after dialyzing coatings for 72 hours against distilled water.

One coating employed in our invention is set forth in Table I.

TABLE I

| Ingredient: | Quantity |
|---|---|
| Gelatin (265 Bloom) _____gms__ | 1600 |
| Sodium hexameta phosphate _____gms__ | 400 |
| Hydrochloric acid _____cc__ | 120 |
| Water _____cc__ | 4800 |

The total solids in the foregoing formulation amounted to 28.9% and the pH was 2.15. In this formulation, it is to be noted that we employ 4 parts of gelatin to 1 part of the meta phosphate polymer.

In making up the coating, the gelatin and the meta phosphate polymer in the form of sodium hexameta phosphate are placed in a glass-lined tank equipped with an anchor agitator. In a separate glass-lined vessel, the acid is mixed with water at about 50° C. The aqueous acid is added with stirring to the dry, mixed ingredients. The stirring produces, after a short period, a homogeneous product, no heat being required during this step. At this point, we prefer to adjust, if necessary, the pH of the solution to about 2.0.

To apply the coating thus achieved, a minimum of equipment and labor are required. The item to be coated, whether it be food or otherwise, can be mounted on any convenient hanging means which are then positioned over the dipping tank to immerse the product desired to be coated. It is only necessary that the item to be coated remain in the solution for a short period, as for example, a few seconds. Upon removal and standing in room temperature air, the coating is found to gel in about ½ minute. Permitting the item to stand for an additional period of an hour or two completes the drying of the coating.

We have successfully applied our coating to a number of food products such as dry sausage, the procedure and results of which are set forth below in Example I.

*Example I*

Six boxes containing samples of each of the following types of dry sausage were provided: pepperoni, thuringer, cervelat, midget summer sausage, yildiz salami, beefcasing salami, liver sausage, and genoa. Each of these types of sausages must be dried for a substantial period ranging from several weeks to several months, depending upon the specifications set down by the Meat Inspection Board of the United States Department of Agriculture. The sausages from three of the six boxes of each type provided were dip coated with the formulation set forth in Table I in accordance with the procedure previously described. The remaining three boxes of each type of sausage were used as controls. At the end of three weeks' storage in a drying room, the coated sausages were found to be completely free of mold while the untreated controls had considerable surface deposits of mold.

In the foregoing example, the surface appearance of the genoas was characterized by sausage sales people as being excellent. The sausages appeared to have retained their natural color and luster. In the case of all of the sausages except the small genoas, the coating appeared to give the sausages a bluish cast, although it was completely effective in preventing the growth of mold. The bluish cast imparted by the coating to these sausages other than the genoas was apparent since these sausages prior to dipping possessed a red color.

An alternative formulation of our coating was provided, the composition of which is set forth in Table II below.

TABLE II

| Ingredient: | Quantity |
|---|---|
| Gelatin (265 Bloom) _____gms__ | 200 |
| Sodium hexameta phosphate _____gms__ | 200 |
| Hydrochloric acid _____cc__ | 40 |
| Water _____cc__ | 1400 |

The total solids in the foregoing formulation amounted to 21.7% and the pH was 1.9.

Genoa sausages were coated with the formulation of Table II, as can be seen from a consideration of Example II below.

*Example II*

Four boxes containing genoa sausages were provided, two of which were coated in accordance with the procedure set forth above with the formulation described in Table II. The remaining two boxes of sausages were used as controls. The sausages were then removed to a drying room, and after 90 days the treated genoa sausages were found to possess no mold and a very attractive luster and color. The untreated genoa sausages were completely covered with mold and, in the opinion of sausage salespeople, completely unsalable.

It was noted that reddish-colored objects sometimes achieve a bluish hue when coated with a composition having a total solids content as set forth in Table I. In most cases where the bluish hue is objectionable, it can be remedied by employing the formulation of Table II or the formulation of Table I diluted to contain half as much solids.

Examples of other items of food which have been coated with the composition of our invention are set forth below in the following examples.

*Example III*

Six 1½ pound samples of cheese were provided, two of these samples being used for controls, two being coated with the formulation of Table I, and two with the formulation of Table II, both formulations being applied by the dipping procedure outlined above. After three weeks' residence time in a refrigerator, the two sets of coated samples showed no surface mold, while substantial mold development was found on the untreated cheese samples.

*Example IV*

Three samples each of the following food items were provided: butter, margarine, and lard. One sample of each food item was untreated so as to provide a control. One item of each was coated with the formulation of Table I and one sample with the formulation of Table II. In providing the formulation by dipping, it was necessary to chill each of these food items to slightly below room temperature so as to insure their remaining in a solid state when dipped, since the items involved all melt below the temperature at which gelatin melts and therefore melt below the temperature of the coating solution. After storage for 5 weeks, the uncoated samples were discovered to have mold while the treated samples were free of any mold.

Example V

Four freshly cut beef loins were provided. Two of these were used as controls and were not coated, the other two being coated with formulations of our invention. One beef loin was coated with the formulation of Table I at the exposed "eye" portion of the meat. The other beef loin was similarly coated, by painting, with the formulation of Table II. After 5 days' residence in a refrigerator having a temperature in the range 36–38° F., the untreated beef loins were found to possess a darker, duller color in the "eye," while the coated loins were found to have a coloration equal to that observed before coating.

Thus, the composition of our invention is useful not only in preventing the development of mold on products—especially those products which require dehydration such as sausage, but also is effective to preserve the natural color of materials that ordinarily change in color with aging, such as many foods.

In addition to applying formulations of our invention to foods, we have also successfully painted these formulations on other non-food items such as walls and wall coverings. In such environments, the coatings have been successful in preventing the development of mold growth while adjacent unpainted walls become covered with mold.

An example of the use of our invention on a non-food item is set forth below as Example VI.

Example VI 1600 grams of 265 Bloom gelatin were mixed with about 400 grams sodium hexameta phosphate by stirring the two ingredients in a glass-lined vessel. In a separate vessel about 120 cc. of concentrated hydrochloric acid was added to about 4800 cc. of water. The temperature of the liquid solution was maintained at about 50° C. The acidic solution was then added with stirring to the dry mixed ingredients. At this point, the solid ingredients were found to be well dispersed throughout the aqueous solution so that a homogeneous product was observed. The homogeneous product was then separated into two equal parts, the pH of one part being adjusted to about 2.0 and the pH of the other part being adjusted to about 5.0.

Six swatches of light colored unprinted woolen material were provided. Two were untreated and were employed as controls. Two others were dipped into the coating solution having a pH of about 2.0 and the remaining two dipped into the coating preparation having a pH of about 5.0. These six samples were then placed in a room where mold was known to exist and under conditions of temperature and humidity favorable to mold propagation. At the end of three weeks the untreated controls and the samples coated with the preparation having a pH of 5.0 had extensive mold deposits thereon. The cloth samples provided with the coating preparation having a pH of 2.0 were completely free of any mold deposit.

Example VII

Six samples of a fabric covered wall were constructed in the following fashion. For each sample a one foot square section of a heavy wire mesh was provided. Each section of wire mesh had applied to it about a ½ inch thick layer of coarse plaster. The plaster was allowed to dry for about one-half hour after which three of the samples were placed in one group and the three other samples in another group. One group of samples was permitted to dry for an additional 24 hours. The partially dried plaster covered wall sections then had their plastered faces overlaid with a one foot square section of cotton wall fabric. The fabric covered samples were then put into air-tight metal boxes which were fitted with closures that clamped the wall section tightly within the box but exposed about a 10 inch square section of the fabric face to the atmosphere. The three wall samples which were permitted to dry for 24 hours were similarly encased at the end of that period.

One of each group of samples (i.e. one sample of partially dried wall section and one sample of substantially dried wall section) was set aside as a control. One sample from each group was coated with the preparation of our invention having a pH of about 2.5 as prepared in the example immediately preceding. The two remaining samples, one from each group, were coated with the preparation of our invention prepared according to the procedure of Example VI but which had a pH of about 5.0. These six samples were permitted to reside in a room having a temperature of about 70° F. and about 20% relative humidity for 24 hours. The controls and the samples coated with the preparation of our invention having a pH of about 2.0 were all substantially identical in appearance. The samples coated with the preparation having a pH of about 5.0 were covered by an opaque film. In contrast to this, the samples coated with the preparation having a pH of 2.0 could be clearly seen since the coating appeared fully transparent. Where the fabric had been printed in areas, the design could be seen with clarity in the samples coated with the preparation having a pH of 2.0 while the designs were difficult to discern in the samples coated with a preparation having a pH of 5.0. Upon removal of the wall sections from their airtight cases, it was found that the partially dried plaster samples had now become substantially dried, being similar in appearance and touch to those which had been substantially dried before having fabric applied thereto.

From the foregoing it is to be appreciated that the coating of our invention is especially suited for any product that requires dehydration after coating, whether it be a food product such as dried sausage or a wall covering such as described in the example set forth immediately above.

Example VIII

Three samples of printed paperboard such as might be used for book covers were provided. One such sample was enrobed with the portion of the preparation described in Example V above that had a pH of 2.0. Another sample was enrobed with the portion of the preparation of Example V which had a pH of 5.0. The third sample was not treated and was used as a control. The three samples were placed in a room where mold was known to exist and which had conditions of temperature and humidity favorable to mold propagation. The samples were examined after one day's residence in this room. Both the untreated sample and the sample enrobed with a coating having a pH of 5.0 showed traces of mold development. No mold development was found on the sample enrobed with a coating having a pH of 2.0. The coating having a pH of 2.0 was fully transparent while the coating having a pH of 5.0 was definitely opaque so as to mask the clarity of the printing on the paperboard sample.

During the one day's residence of these three samples in the room a film of dust and dirt had deposited on the three samples. The deposited surfaces of the three samples were then wiped with damp cloths. The two enrobed samples could be wiped clean with no traces of dirt remaining and with the coating unaffected by contact with water. The untreated sample became streaked and unsightly.

Thus the coating of our invention is seen to be transparent and water resistant but one that does permit the dehydration of a product coated therewith.

The foregoing detailed description has been given for clearness of understanding only and no unnecessary limitations are to be inferred therefrom.

We claim:

1. A coating composition, comprising a complex of gelatin and a meta phosphoric acid polymer in an acidic aqueous solution.

2. A composition of the character set forth in claim 1 wherein the pH of the said solution is below about 3.5.

3. A coating composition as set forth in claim 1, wherein the pH of the composition is sufficiently acidic to render the coating transparent.

4. A coating composition, the essential ingredient of which is a complex comprising gelatin and a meta phosphoric acid polymer, formed in an acidic aqueous solution the ratio of the gelatin to the polymer being about 4 to 1.

5. As an article of manufacture, a film formed as the reaction product of gelatin and a meta phosphoric acid polymer in an acidic aqueous solution.

6. A coating composition comprising a complex of gelatin and a meta phosphate polymer, said meta phosphate polymer being from about 5 to about 50% by weight of said composition, said composition having a pH of from about 1.5 to about 3.5.

7. In a method for preparing a coating composition, the steps of mixing gelatin and a meta phosphoric acid polymer in an aqueous solution and adjusting the pH of said solution below about 3.5.

8. A method of providing a coated article, comprising the steps of forming a dispersion of gelatin and a meta phosphate polymer in acidic aqueous solution, applying the said dispersion to an article to be coated, and drying the same.

9. A method of providing a coated article, comprising the steps of forming a dispersion of gelatin and a meta phosphoric acid polymer in an acidic aqueous solution favoring the production of a complex including said gelatin and said polymer wherein the latter is present in the amount of about 5–50% of the weight of gelatin, applying said dispersion to an article to be coated, and drying the same.

10. A method of coating an article, comprising forming a dispersion of gelatin and a meta phosphoric acid polymer in an aqueous solution, adjusting the pH of said solution below about 3.5, applying said dispersion to an article, and air drying the same.

11. The method of claim 10, wherein the step of applying the said dispersion comprises dipping the said article into the said dispersion and removing the same.

12. A method of providing a mold-proof food product, comprising introducing water into a vessel, adding hydrochloric acid thereto, stirring gelatin into the acidified water and then mixing therewith hexameta phosphate, applying the solution so produced to the food product to coat the same, and drying the product.

13. A method of providing a coated article comprising the steps of forming a dispersion of gelatin and a meta phosphoric acid polymer in an aqueous solution favoring the production of a complex including said gelatin and said polymer, said polymer being present in the amount of about 5 to 50% by weight of said gelatin, adjusting the pH of said dispersion to within the range of from about 1.5 to about 3.5, applying said dispersion to an article to be coated, and drying the same.

14. A method of coating an article comprising forming a dispersion of gelatin and a meta phosphoric polymer, said polymer amounting to from about 5 to about 50% by weight of said gelatin, adjusting the pH of said dispersion to from about 1.5 to about 3.5, applying said dispersion to an article, and air drying the same.

15. A method of making a coated meat product comprising mixing gelatin and a metaphosphoric acid polymer in an acidic solution at a temperature above the melting-point of said gelatin and applying said aqueous mixture to a meat product.

16. A method of the character set forth in claim 15 wherein the meat product is a sausage.

17. A method of the character set forth in claim 16 wherein the sausage is coated with the said aqueous mixture prior to drying.

18. A method of making a coated meat product comprising mixing gelatin and a metaphosphoric acid polymer in an aqueous solution having a pH of from about 1.5 to 3.5, said metaphosphoric acid polymer amounting to from about 5% to 50% by weight of the gelatin, whereby there is formed a reaction product of gelatin and a metaphosphoric acid, and applying said reaction product of gelatin and a metaphosphoric acid polymer in an aqueous mixture to a meat product.

19. The product made by the process of claim 18.

20. As an article of manufacture, a product to be packaged enrobed in a coating comprising a complex which is the reaction product of gelatin and a meta phosphoric acid polymer in an acidic aqueous solution.

21. A composition of the character set forth in claim 20 wherein the pH of the said solution is below about 3.5.

22. An article of manufacture comprising a product to be enrobed in a coating, and a coating comprising a film the essential ingredient of which is a complex comprising gelatin and a meta phosphoric acid polymer formed in an acidic aqueous solution and wherein the ratio of gelatin to polymer is about 4 to 1.

23. As an article of manufacture, a product to be packaged encased in a non-adherent coating comprising the reaction product of a water-dispersible gelatin and a meta phosphate polymer in an acidic aqueous solution, said composition being air driable to form a water-resistant, tough, transparent, color-retaining film on the product to which the composition has been applied.

24. An article of manufacture comprising a formed meat product and coating thereon, said coating comprising a complex of gelatin and a metaphosphate polymer, said complex being formed in an acidic aqueous solution.

25. An article of manufacture comprising a formed meat product and a coating thereon, said coating including the reaction product of gelatin and a metaphosphate polymer in an acidic aqueous solution.

26. An article of the character set forth in claim 25 wherein the said reaction product is formed in an aqueous solution having a pH below 3.5.

27. An article of manufacture comprising a formed meat product and a coating thereon, said coating including as an essential ingredient the reaction product of gelatin and a metaphosphoric acid polymer, said reaction product being formed in an acidic aqueous solution.

28. An article of the character set forth in claim 27 wherein the said reaction product is formed in an aqueous solution having a pH below about 3.5.

29. An article of the character set forth in claim 27 wherein the pH of the coating is at a value yielding a transparent coating.

30. An article of manufacture comprising a sausage and coating thereon, said coating comprising gelatin and a metaphosphate polymer formed in an acidic aqueous solution.

31. An article of manufacture comprising a sausage and a coating thereon, said coating including the reaction product of gelatin and a metaphosphate polymer, said reaction product being formed in an acidic aqueous solution.

32. An article of the character set forth in claim 31 wherein the said reaction product is formed in an aqueous solution having a pH below 3.5.

33. An article of manufacture comprising a sausage and a coating thereon, said coating including as an essential ingredient the reaction product of gelatin and a metaphosphoric acid polymer, said reaction product being formed in an acidic aqueous solution.

34. An article of the character set forth in claim 33 wherein the said reaction product is formed in an aqueous solution having a pH below about 3.5.

35. An article of the character set forth in claim 33 wherein the pH of the coating is at a value yielding a transparent coating.

36. An article of manufacture comprising a sausage and a coating thereon, said coating including as an essential ingredient a complex formed in aqueous solution below a pH of about 3.5 and containing as ingredients, gelatin and a metaphosphoric acid polymer, said ingredients being present in such quantity as to not produce an undesirable coloration in said coating when said sausage is light colored.

References Cited in the file of this patent

UNITED STATES PATENTS

| | | |
|---|---|---|
| 2,352,611 | Bowers | July 4, 1944 |
| 2,658,001 | Young et al. | Nov. 3, 1953 |